(12) United States Patent
Svantesson

(10) Patent No.: US 6,890,029 B2
(45) Date of Patent: May 10, 2005

(54) HEAD-REST ARRANGEMENT

(75) Inventor: Anders Svantesson, Tollered (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 10/483,584

(22) PCT Filed: May 24, 2002

(86) PCT No.: PCT/SE02/00995
§ 371 (c)(1),
(2), (4) Date: May 28, 2004

(87) PCT Pub. No.: WO03/006275
PCT Pub. Date: Jan. 23, 2003

(65) Prior Publication Data
US 2004/0195872 A1 Oct. 7, 2004

(30) Foreign Application Priority Data
Jul. 10, 2001 (GB) .............................................. 0116829

(51) Int. Cl.⁷ ................................................ B60N 2/48
(52) U.S. Cl. ............................. 297/216.12; 297/216.13; 297/216.14
(58) Field of Search ....................... 297/216.12, 216.13, 297/213.14

(56) References Cited

U.S. PATENT DOCUMENTS

| 5,738,412 | A | * | 4/1998 | Aufrere et al. | ......... 297/216.12 |
| 5,795,019 | A | * | 8/1998 | Wieclawski | ........ 297/216.12 X |
| 6,062,642 | A | * | 5/2000 | Sinnhuber et al. | ..... 297/216.13 |
| 6,352,285 | B1 | * | 3/2002 | Schulte et al. | ......... 297/216.13 |
| 6,604,788 | B1 | * | 8/2003 | Humer | .................. 297/216.13 |

* cited by examiner

Primary Examiner—Anthony D. Barfield
(74) Attorney, Agent, or Firm—Brinks Hofer Gilson & Lione

(57) ABSTRACT

A head-rest arrangement for a vehicle seat includes a head-rest mounted in position on a vehicle seat so that it can move forwardly from an initial position to a final position. A spring mechanism is provided to move the head-rest. A release mechanism is actuated by movement of a pressure responsive element within the back of the seat to initially prevent operation of the spring mechanism, and to release the spring mechanism when pressure is applied during a rear impact.

18 Claims, 8 Drawing Sheets

HEAD-REST ARRANGEMENT

CROSS REFERENCE TO RELATED APPLICATION

Figure 1:
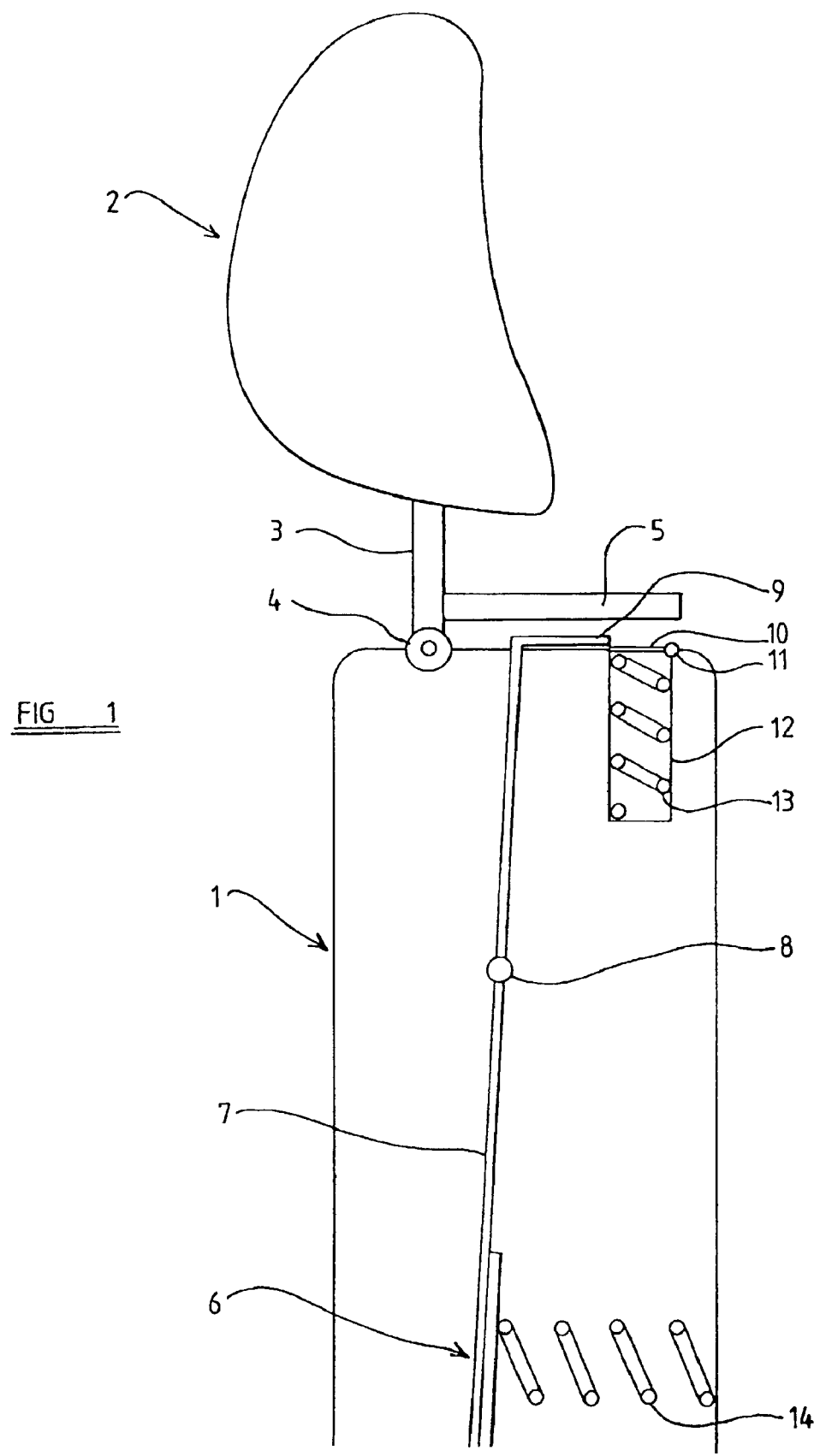

This application claims the benefit of related British patent application Serial No. 0302088.0, filed Jan. 29, 2003.

BACKGROUND OF THE INVENTION

The present invention relates to a head-rest arrangement, and more particularly relates to a head-rest arrangement for use in a motor vehicle seat.

It is known that if a motor vehicle is involved in a rear impact, the occupant of a seat within the vehicle may suffer from so-called "whiplash" injuries.

When a vehicle is involved in a rear impact, the chassis of the vehicle is suddenly accelerated from a stationary condition or a low speed, to a relatively high speed. The seats within the vehicle, which are typically securely fastened to the chassis, thus experience an equivalent rapid acceleration. That rapid acceleration is imparted to the parts of the occupant of the seat that are in contact with the seat; namely, the posterior and the lower part of the torso. The head of the occupant of the seat remains in its initial position, or at its initial velocity. Since the torso of the occupant of the seat has been given a substantial acceleration, the torso moves forwardly relative to the head. The neck of the occupant of the seat thus becomes distorted from its ordinary condition and is deformed to an "S"-type configuration. Finally the head is accelerated forwardly, by the force applied to it by the neck, with a simultaneous rotation about a horizontal axis. This imparts a severe strain on the neck which causes the so-called "whiplash" injuries.

It has been found that the degree of whiplash injury may be reduced if the head-rest of the vehicle seat is moved forwardly at an initial stage of a rear impact situation so that the head-rest moves into contact with the rear part of the head of the occupant of the seat. Then, as the seat is accelerated forwardly accelerating the posterior and torso of the occupant, the seat simultaneously accelerates the head of the occupant forwardly. The head moves simultaneously with the torso, thus minimising the risk of whiplash injury arising.

SUMMARY OF THE INVENTION

The present invention seeks to provide an improved head-rest arrangement.

According to this invention there is provided a head-rest arrangement for a vehicle seat. The head-rest being mounted in position on the vehicle seat in such a way that the head-rest can move from an initial position to a final position in which the head-rest is located forwardly of the initial position. A spring mechanism is adapted to move the head-rest from the first position to the final position. The release means is actuated by movement of a pressure responsive element located within the back of the seat to prevent operation of the spring mechanism. To release the spring mechanism and to permit operation of the spring mechanism, pressure is applied to the pressure responsive element during a rear impact.

Preferably the pressure responsive element is mounted on a support arm, the support arm being adapted to rotate about a substantially horizontal pivot axis. The pressure responsive element is, in one embodiment, at the lower end of the support arm. The release means are at the top of the support arm and the pivot axis being located between the ends of the support arm. In another embodiment the pivot axis is at the upper end of the support arm.

Conveniently, the spring mechanism comprises a spring initially retained in a compressed form and adapted to operate, when released, upon a member which moves in synchronism with the head-rest.

In one embodiment, the pressure responsive element is mounted on a support arm which carries a finger which, in an initial condition, serves to retain the spring in the compressed form, but on movement of the pressure responsive element, permits the spring to expand.

Conveniently the finger engages a cover of a recess. The recess contains a compressed spring initially retained in position by the cover. The head-rest being provided with an actuating element located adjacent the recess and adapted to be engaged by the spring when the spring is released to move the head-rest.

Preferably the head-rest is mounted to effect a pivotal movement from the first position to the final position.

In another embodiment the head-rest is supported by means of a spring-biased parallel linkage, the means adapted to prevent operation of the linkage comprising an engagement element engaging an abutment on the linkage. Part of the engagement element is retained by a retaining plate. The retaining plate being adapted to be moved to a position in which it no longer retains the engagement element in response to the movement of the pressure responsive element within the back-rest, permitting the engagement element to move so that operation of the linkage is permitted.

Advantageously the engagement element is a pivotally mounted hook.

In an alternative embodiment of the invention, the release means includes a lever arm, one end of which initially engages a pivotally mounted retainer arm. To hold the retainer arm in position, the retainer arm has a guide surface engaged by a projection connected to the head-rest, the arrangement being such that a predetermined movement of the lever arm will release the retainer arm, thus permitting the retainer arm and the head-rest to move to the final position with the projection moving along the guide surface.

Preferably the support arm carries a projecting finger, and the arrangement is such that the lever arm is moved in response to a predetermined movement of the finger.

Conveniently, the guide surface forms one side of a closed ended slot in the retainer arm, the projection being received in the slot.

Figure 2:
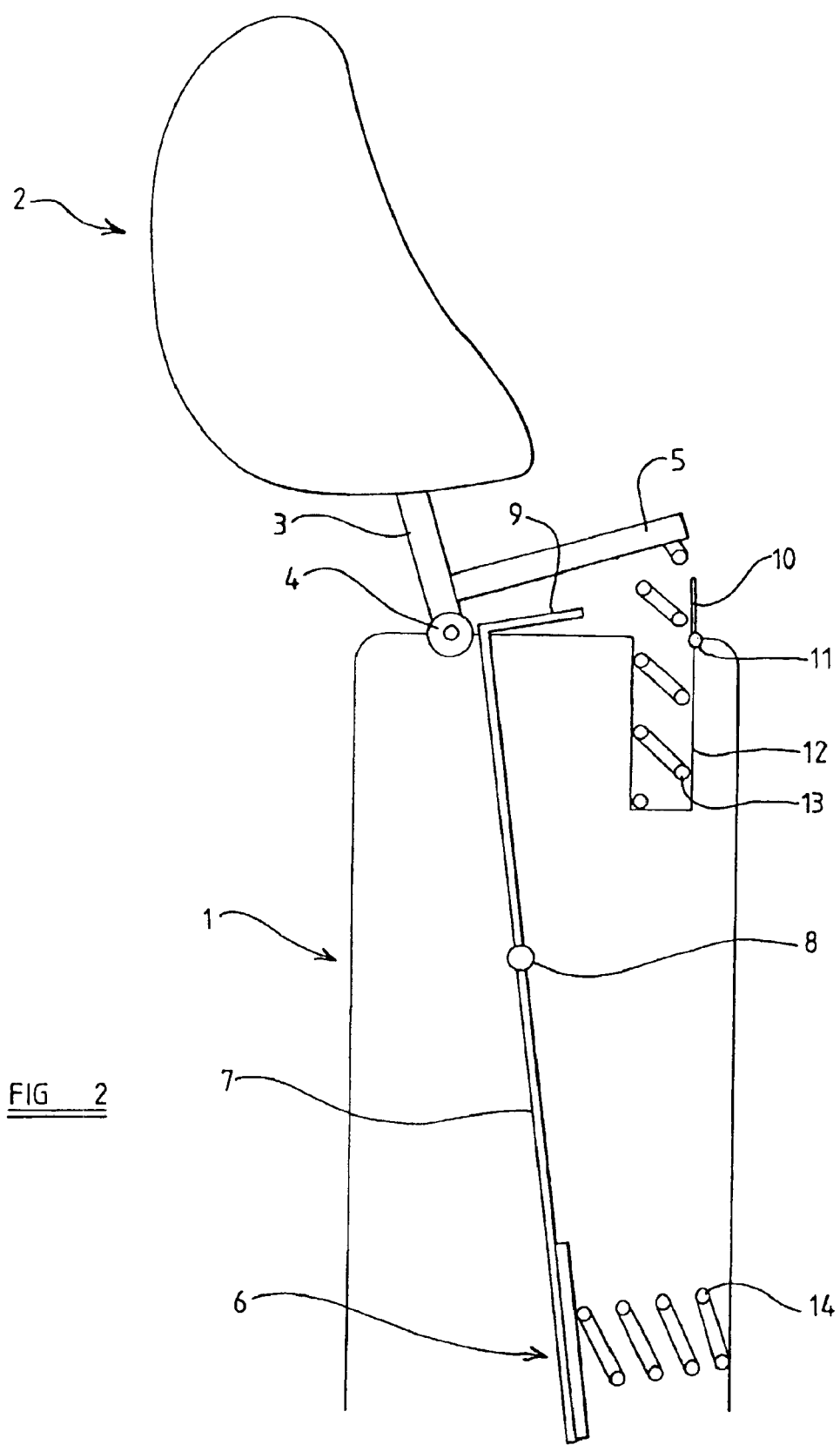
Figure 3:
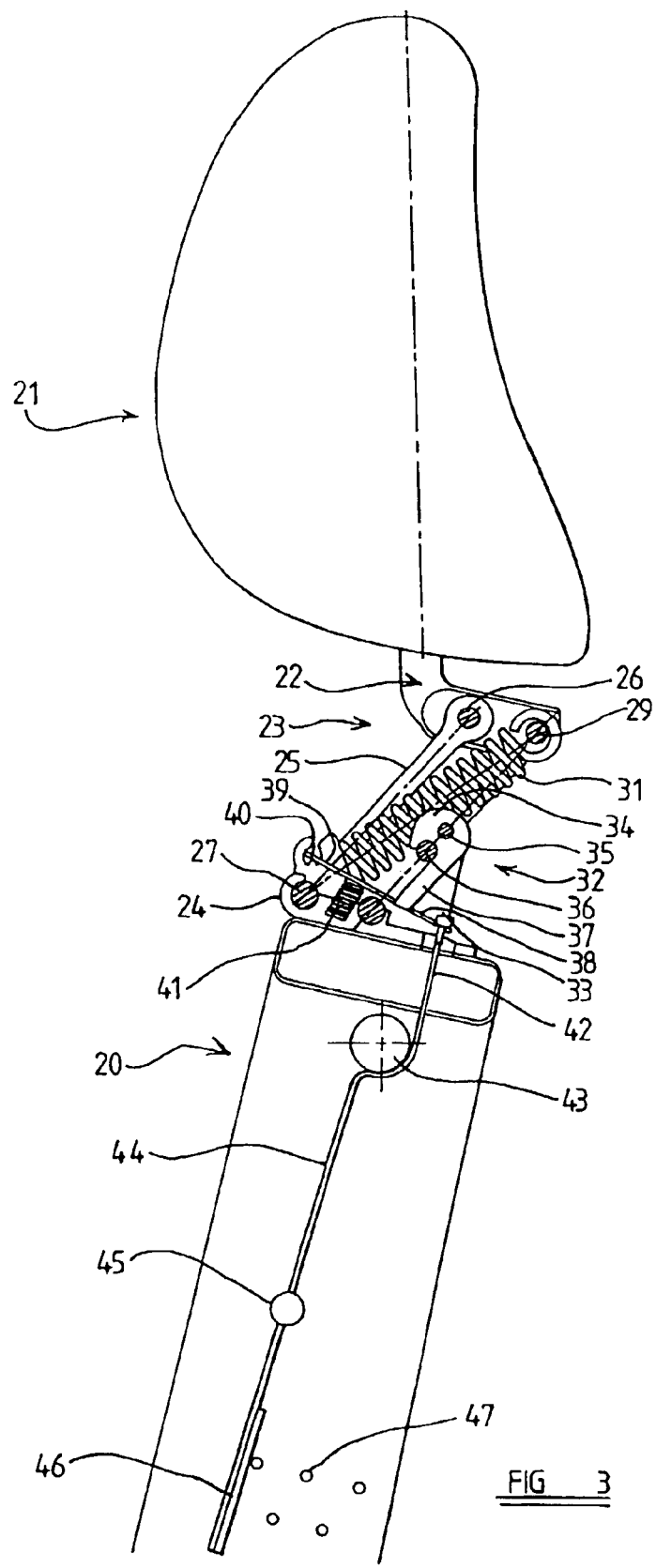
Figure 4:
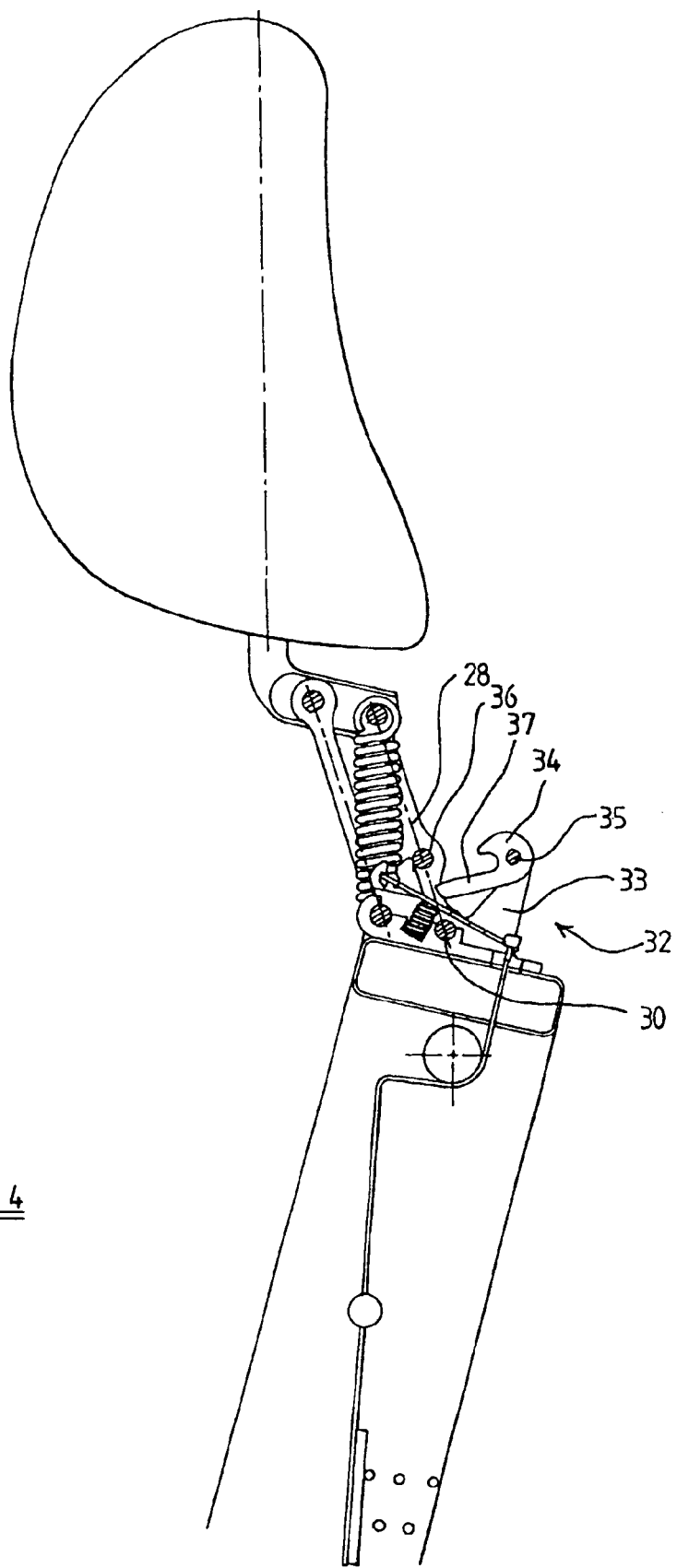
Figure 5:
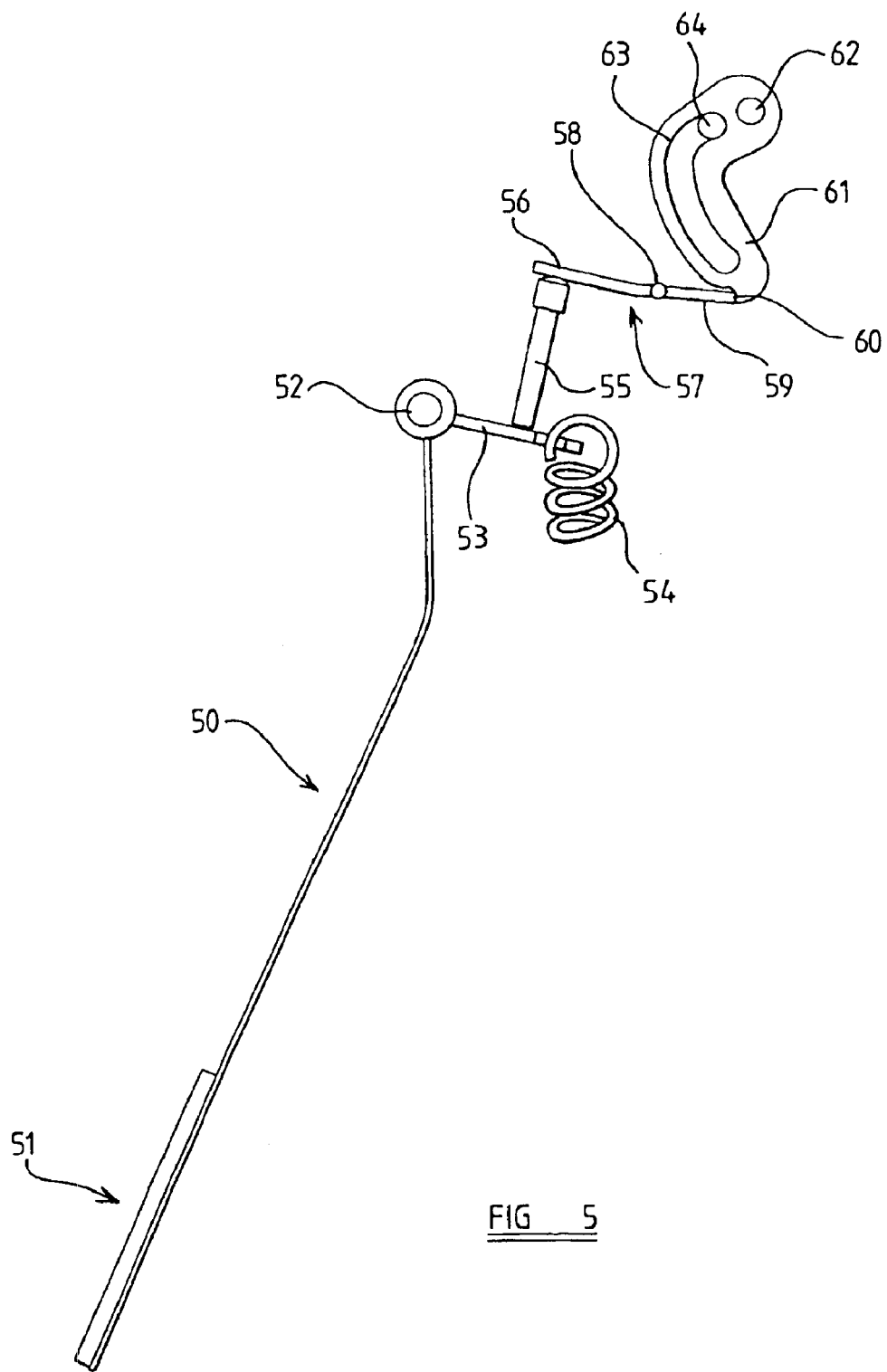
Figure 6:
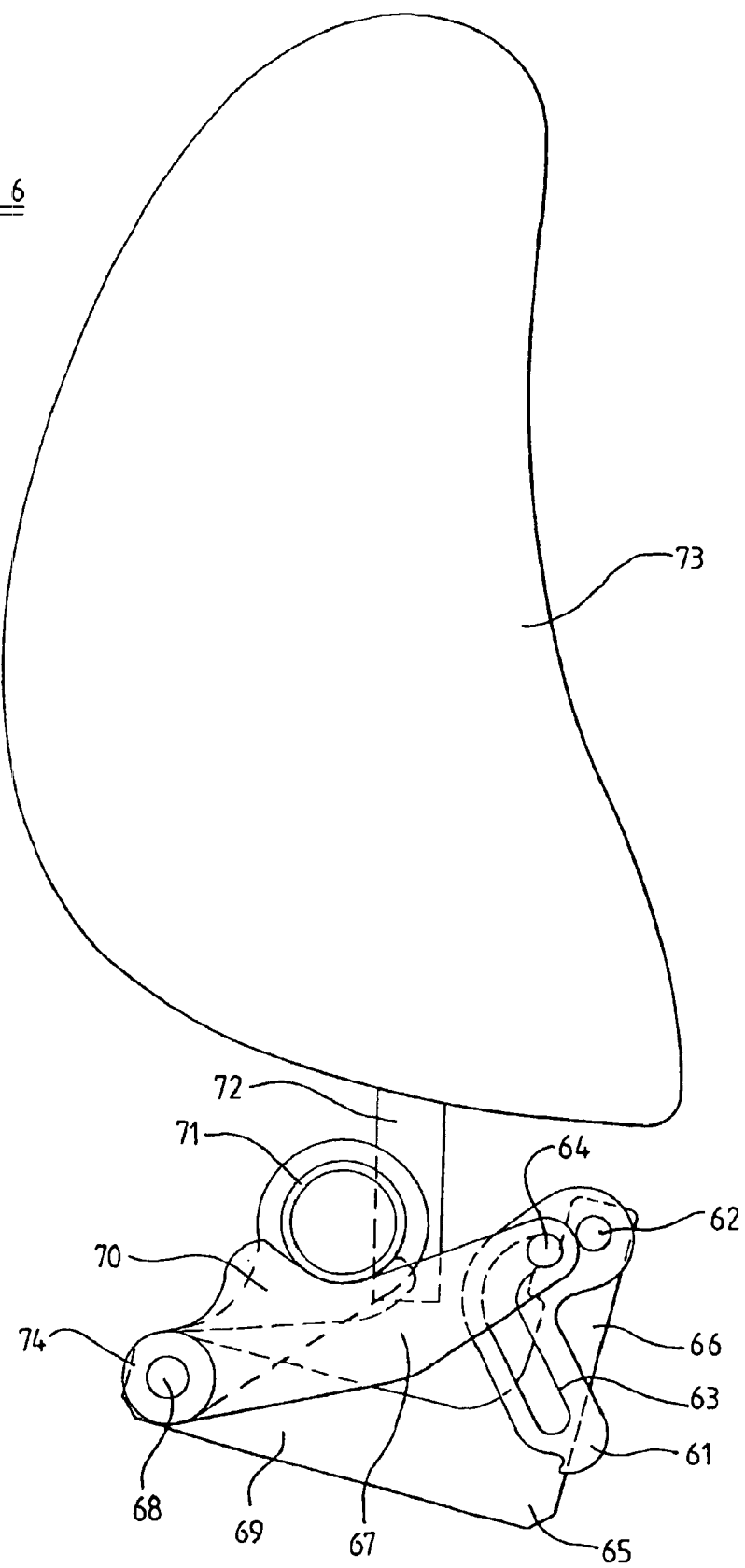
Figure 7:
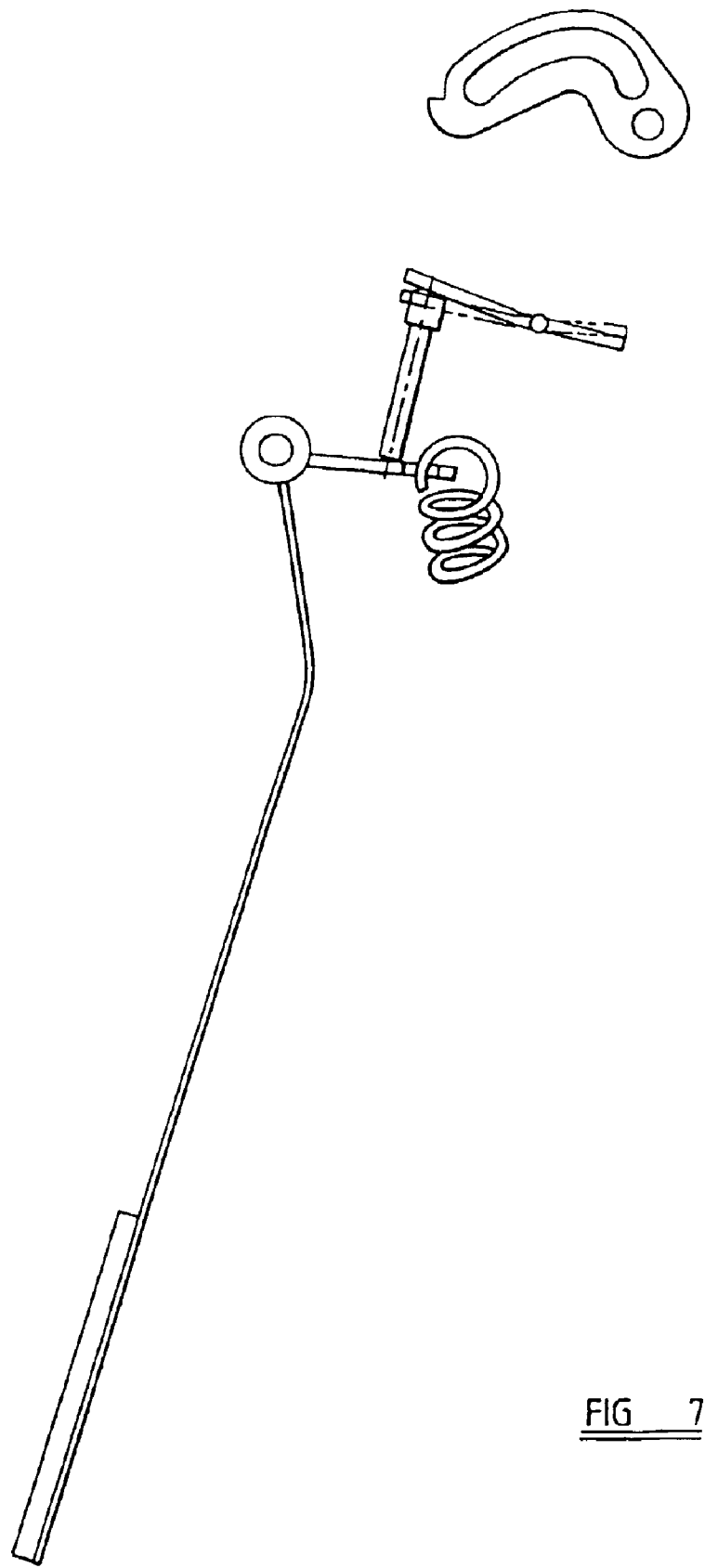
Figure 8:
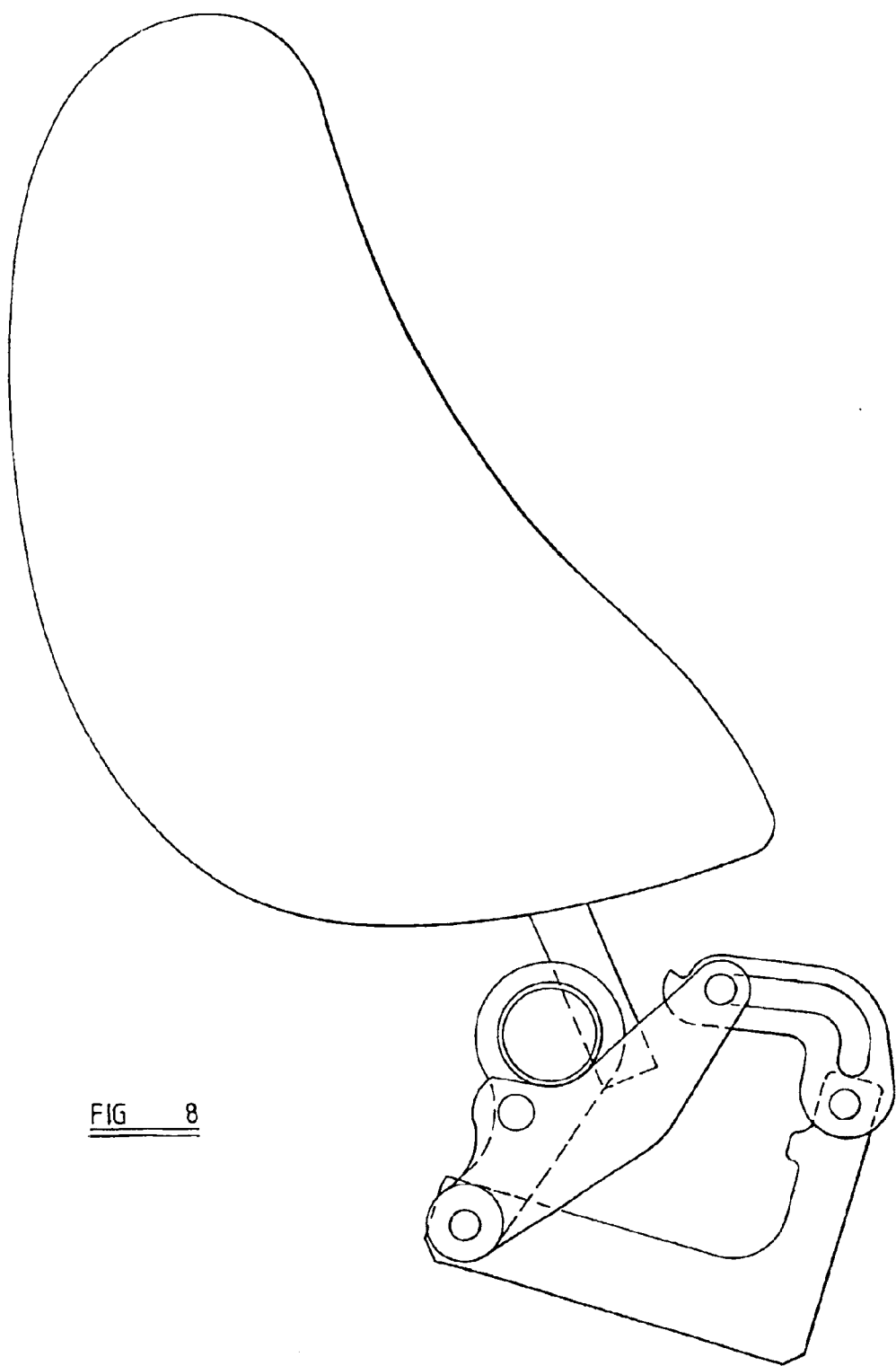

In order that the invention may be more readily understood, and so that further features thereof may be appreciated, the invention will now be described, by way of example, with reference to the accompanying drawings in which:

FIG. 1 is a diagrammatic part-sectional view of one embodiment of the invention in an initial condition, FIG. 2 is a view corresponding to FIG. 1 showing the illustrated embodiment in its condition after a rear impact has occurred, FIG. 3 is a view corresponding to FIG. 1, but illustrating a second embodiment of the invention in its normal condition, FIG. 4 is a view corresponding to FIG. 3 illustrating the embodiment of FIG. 3 in its condition after a rear impact has occurred, FIG. 5 is a view of part of an alternative embodiment of the invention in the first condition, FIG. 6 is a view of another part of the embodiment of FIG. 5 in the first condition, FIG. 7 is a view corresponding to FIG. 5 illustrating that part of the embodiment in a second condition after a rear impact has occurred, and FIG. 8 is a view corresponding to FIG. 6 showing that part of the embodiment in the second condition.

DETAILED DESCRIPTION OF THE INVENTION

Referring initially to FIG. 1 of the accompanying drawings, a vehicle seat has a seat-back 1 which is provided with a head-rest 2. The head-rest 2 is mounted on one or more support rods 3. The support rods are pivotally connected to the upper part of the head-rest by a pivotal connection 4, so that the entire head-rest can move pivotally about a horizontal axis substantially aligned with the pivotal connection 4, between an initial upright position and a final position which is forward of the initial position. The support rods 3 are provided adjacent the lower ends thereof with a rearwardly extending initially horizontal actuating plate 5.

Mounted within the seat-back 1 is a pressure responsive element in the form of a pressure plate 6 which is located at a point substantially co-aligned with the center of the torso of the occupant of the seat. Pressure plate 6 is supported by a support arm 7 which is mounted for pivotal movement about a horizontal pivot axis 8 and is located near the mid-point of the support arm. The upper end of the support arm 7 is provided with a horizontally extending retaining finger 9. Retaining finger 9 passes over an edge of a cover 10 and is mounted for pivotal movement about a pivot axis 11 co-aligned with one edge thereof. The cover 10 serves to close a recess 12 which contains a compressed biasing spring 13. It is to be appreciated that in the condition illustrated in FIG. 1, the finger 9 engages the cover 10 to retain the cover 10 in a closed condition, thus retaining the spring 13 in a compressed condition. It is also appreciated that part of the actuating plate 5 lies immediately above the cover 10.

In the embodiment shown, the pressure plate 6 is provided with a biasing spring 14 which serves to resist rearward movement of the pressure plate 6.

If a vehicle, provided with a seat of the type as shown in FIG. 1, is involved in a rear impact, provided that the rear impact is of sufficient severity that the force exerted on the back-rest of the seat by the torso of the occupant is sufficient to move the pressure plate 6 rearwardly against the biasing force of the spring 14, the finger 9 will act as a release mechanism and will become disengaged from the cover 10. Consequently the cover 10 may open, and the spring 13 may expand. The spring 13 will engage the actuating plate 5 and will move the head-rest 2 forwardly about the pivot axis 4. The head-rest will then occupy the forward final position in which it will engage the rear part of the head of the occupant of the seat, thus minimising the risk of whiplash injury.

The head-rest 2 may, of course, initially be retained in the initial position by one or more frangible elements adapted to break when the spring 13 acts on the actuating plate 5. Thus there will not be a tendency for the head-rest to "flop" forwardly during normal deceleration.

Referring now to FIG. 3 of the accompanying drawings, in a preferred and more sophisticated embodiment of the invention, the back-rest 20 of a vehicle seat is provided with a head-rest 21. The head-rest 21 is supported by means of two support elements 22 which extend into the lower part of the head-rest 21. The support elements 22 are located adjacent the opposed sides of the head-rest. Each support element 22 is connected by means of a parallel linkage 23, to a support plate 24, mounted at the top of the back-rest of the seat. Each parallel linkage 23 consists of a first link arm 25 which extends between a pivot point 26 provided on the support 22, and a pivot point 27 provided on the support plate 24. The parallel arm linkage 23 also comprises a second arm 28 (shown most clearly in FIG. 4), which extends from a pivot point 29 on the support 22 to a second pivot point 30 on the support plate 24.

A tension spring 31 is provided which extends from the pivot point 29 to the pivot point 27, and exerts a biasing force tending to bias those two pivot points together.

In the initial position of the parallel linkage 23, as shown in FIG. 3, the two linkage arms are directed towards the right, as shown in FIG. 3, and the spring 31 is in an extended condition. The spring 31 thus exerts a force tending to bias the parallel linkage to move the head-rest to the left, or forwardly.

The upper part of the seat-back 20 supports a catch arrangement 32 associated with one of the parallel linkages, although each parallel linkage may have its own catch arrangement. The catch arrangement 32 comprises a vertical support plate 33 which supports a pivotally mounted hook 34. The hook 34 is mounted for movement about a horizontal pivot axis 35. The hook is adapted to act as an engagement element, engaging part of the linkage to hold the linkage in a predetermined position. Thus the recess of the hook receives an abutment pin 36 provided on the link arm 28. The hook 34 is provided with an arm 37 which is initially received within an aperture 38 formed in a plate 39, which acts as a retaining plate. With the arm 37 received in the aperture 38, the hook is retained in position and the abutment pin 36 is engaged by the hook, thus preventing movement of the parallel linkage.

The plate 39 has one end 40 thereof retained in position, and is associated with a biasing spring 41 biasing the rest of the plate, about the one end 40, towards the arm 37 so that the aperture 38 formed in the plate engages and retains the arm 37 provided on the hook 34. A wire or cable 42 is connected to the free edge of the plate adjacent the aperture 38. The wire or cable 42 passes downwardly into the back of the seat and passes round a guide pulley 43. The end of the wire or cable 42 is connected to the upper end of a support arm 44 which is pivotally mounted in position for movement about a horizontal pivot axis 45 and carries, at its lower end, a pressure responsive element in the form of a pressure plate 46 which is located within the back-rest 20 of the seat. The pressure plate 46 is provided with a biasing spring 47 which serves to bias the pressure plate forwardly, as shown.

When the described arrangement is in the initial condition, as shown in FIG. 3, the hook 34 engages the pin 36 provided on the link arm 28, thus serving to prevent the head-rest from moving from the illustrated position.

Should the vehicle be involved in a rear impact to ensure that the pressure plate 46 is moved rearwardly against the biasing effect of the spring 47, the upper end of the support arm 44 will move forwardly to occupy the position shown in FIG. 4, thus drawing the upper part of the wire or cable 42 downwardly, with the lower part of the wire or cable 42 passing round the pulley 43. The plate 39 thus moves against the biasing effect of the spring 41 about the fixed edge 40. This movement serves to move the aperture 38 away from the free end of the arm 37, and thus the hook 34 is released to be free to rotate about the axis 35. The hook 34 can thus rotate to become disengaged from the abutment pin 36.

The spring 31 can draw the pivot point 29 towards the pivot point 27, causing the above-mentioned rotation of the hook 34. This leads to the disengagement of the hook 34 from the abutment pin 36. The parallel linkage moves, under the effect of the spring 31, to the condition shown in FIG. 4 in which the head-rest has moved forwardly, relative to the back-rest 20 of the seat, from the initial position to the final position, thus engaging the rear part of the head of an occupant of the seat to minimise the risk of whiplash injury occurring.

Referring now to FIGS. 5 to 8, a further embodiment of the invention is illustrated. FIGS. 5 and 6 illustrate separate parts of the embodiment in a first condition, which is the condition occupied by the components before a rear impact has occurred.

Referring to FIG. 5, mounted within the seat-back (not shown) is a support arm 50 which carries, at its lower end, a pressure responsive element in the form of a pressure plate 51. The support arm 50 is pivotally mounted 52 at its upper end and carries a generally horizontally extending finger 53 which is provided at the upper end thereof. The free end of the finger 53 is engaged by a spring 54 which applies a resilient bias to the support arm 50 so that it is retained in an initial position. The finger 53 supports the lower end of an elongate movement transmission element 55. The upper end engages a first end 56 of a lever arm 57 which is mounted for movement about a horizontal pivot axis 58 and is located substantially mid-way between the first end 56 of the lever arm, and a second end 59 of the lever arm. The second end 59, of the lever arm, initially engages an abutment 60 which is formed at one end of a retainer arm 61. The retainer arm 61 is of an elongate cranked form and is mounted for movement about a horizontal pivot axis 62 which is located at the end of the arm 61 remote from the abutment 60. A cranked closed ended slot 63 is defined in the retainer arm 61 and receives a projection 64 which can move along the slot, with the projection 64 being guided by the side walls of the slot which constitute guide surfaces.

Referring now to FIG. 6, a support bracket 65 is illustrated which is mounted securely in position within the vehicle seat. The support bracket 65 has an upstanding arm 66, the upper end of which carries the pivot 62 which pivotally supports the retainer arm 61. The retainer arm 61 can thus move about the pivot axis 62. The projection 64 is carried at one end of a pivotally movable arm 67. The other end of which is pivotally connected 68 to a forwardly extending limb 69 of the support bracket 65. Mounted to move with moveable arm 67 is a further pivotally mounted support arm 70 which supports one end of a transverse tube 71. The transverse tube 71 supports, by means of support posts 72, a head-rest 73. The projection 64 is thus connected to and moves in synchronism with the head-rest.

A spring mechanism 74 is provided tending to bias the head-rest 73 to pivot forwardly about the pivotal connection 68. The spring mechanism 74 is a torsion spring aligned with the axis of the pivotal connection 68. However, such forward movement of the head-rest 73 would tend to cause the retainer arm 61 to pivot about the pivot axis 62, and such movement of the retainer arm 61 is prevented by engagement of the end of the lever arm 57 and the abutment 60.

It will be appreciated, therefore, that the head-rest, ordinarily, remains in the initial position illustrated in FIG. 6.

Should the vehicle in which the described arrangement is mounted be involved in a rear impact, so that the pressure plate 51 is moved rearwardly against the biasing effect provided by the spring 54, finger 53 will be moved rotationally about the pivot axis 52, in a generally upward direction. Movement transmission element 55 will cause the first end 56 of the lever arm 57 to move upwardly, thus moving the second end 59 of the lever arm downwardly as the lever arm rotates about the horizontal pivot axis 58 and disengaging the second end 59 of the lever arm from the abutment 60. The retainer arm is then free to rotate. Consequently, the spring mechanism 74 may cause the entire head-rest 73 to move forwardly about the axis of the pivotal connection 68 towards the final position, moving the projection 64 along the slot 63. As the projection 64 moves along the slot 63 it is guided by the guide surfaces constituted by the opposed edges of the slot. Since the slot is a closed ended slot, the projection 64 cannot escape from the slot and the forward movement of the head-rest is thus limited in that the forward movement ceases when the projection 64 reaches the forward-most end of the slot 63 when the head-rest 73 is in the final position illustrated in FIG. 8.

In this embodiment the spring mechanism is a torsion spring 74. In alternative embodiments, the spring may be a compression spring located to provide an upward thrust to part of the head-rest assembly that tilts forward.

It is to be appreciated that in all the described embodiments of the invention, the head-rest is mounted in position so that it can move forwardly from an initial position to a final position and is adapted to move forwardly by virtue of a spring mechanism. However, the spring mechanism is prevented from actuating until a rear impact has been sensed.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A head-rest for a vehicle seat having a seat back, the head-rest being mounted in position on the vehicle seat in such a way that the head-rest can move from an initial position to a final position in which the head-rest is located forwardly of the initial position, comprising a spring mechanism adapted to move the head-rest from the initial position to the final position wherein the spring mechanism comprises a spring adapted to operate, when released, upon a member which moves in synchronism with the head-rest; and a release means actuated by movement of a pressure responsive element within the seat back to prevent operation of the spring mechanism, and to permit the operation of the spring mechanism when pressure is applied to the pressure responsive element during a rear impact.

2. An arrangement according to claim 1 wherein the pressure responsive element is mounted for movement on a support arm, the support arm being adapted to rotate about a substantially horizontal pivot axis.

3. An arrangement according to claim 1 wherein the pressure responsive element is mounted on a support arm which carries a finger which, in the initial condition, serves to retain the spring mechanism but which, on said movement of the pressure responsive element, permits the spring mechanism to move the head-rest from the initial position to the final position.

4. An arrangement according to claim 3 wherein the finger engages a cover of a recess, the recess containing spring, the mechanism initially retained in position by the cover, the head-rest being provided with an actuating element located adjacent the recess, adapted to be engaged by the spring mechanism when the spring mechanism is released to move the head-rest.

5. An arrangement according to claim 4 wherein the head-rest is mounted to effect a pivotal movement from the initial position to the final position.

6. An arrangement according to claim 1 wherein the head-rest is supported by a spring-biased parallel linkage, the release means adapted to prevent operation of the linkage comprising an engagement element engaging an abutment on the linkage, a part of the engagement element being retained by a retaining plate, the retaining plate being adapted to be moved to a position in which it no longer retains the engagement element in response to the movement of said pressure responsive element within the back-rest, permitting the engagement element to move so that operation of the parallel linkage is permitted.

7. An arrangement according to claim 6 wherein the engagement element is a pivotally mounted hook.

8. An arrangement according to claim 2 wherein the release means includes a lever arm, one end of the lever arm which initially engages a pivotally mounted retainer arm, to hold the retainer arm in position, the retainer arm having a guide surface engaged by a projection connected to the head-rest, the arrangement being such that a predetermined movement of the lever arm will release the retainer arm, thus permitting the retainer arm to move and allow the head-rest to move to the final position with the projection moving along the guide surface.

9. An arrangement according to claim 8 wherein the support arm carries a projecting finger comprising the projection, and the arrangement is such that the lever arm is moved in response to a predetermined movement of the finger.

10. An arrangement according to claim 8 wherein the guide surface forms one side of a close ended slot in the retainer arm, the projection being received in the slot.

11. A head-rest for a vehicle seat having a seat back, the head-rest being mounted in position on the vehicle seat in such a way that the head-rest can move from an initial position to a final position in which the head-rest is located forwardly of the initial position, comprising a spring mechanism adapted to move the head-rest from the initial position to the final position, release means actuated by movement of a pressure responsive element within the seat back to prevent operation of the spring mechanism, and to release the spring mechanism to permit operation of the spring mechanism when pressure is applied to the pressure responsive element during a rear impact;

wherein the spring mechanism comprises a spring initially retained in a compressed form, and adapted to operate, when released, upon a member which moves in synchronism with the head-rest; and wherein the pressure responsive element is mounted on a support arm which carries a finger which, in the initial condition, serves to retain the spring mechanism in the compressed form but which, on said movement of the pressure responsive element, permits the spring mechanism to expand.

12. An arrangement according to claim 11 wherein the finger engages a cover of a recess, the recess containing spring, the mechanism initially retained in position by the cover, the head-rest being provided with an actuating element located adjacent the recess, adapted to be engaged by the spring mechanism when the spring mechanism is released to move the head-rest.

13. An arrangement according to claim 12 wherein the head-rest is mounted to effect a pivotal movement from the initial position to the final position.

14. A head-rest for a vehicle seat having a seat back, the head-rest being mounted in position on the vehicle seat in such a way that the head-rest can move from an initial position to a final position in which the head-rest is located forwardly of the initial position, comprising a spring mechanism adapted to move the head-rest from the initial position to the final position, release means actuated by movement of a pressure responsive element within the seat back to prevent operation of the spring mechanism, and to release the spring mechanism to permit operation of the spring mechanism when pressure is applied to the pressure responsive element during a rear impact, wherein the head-rest is supported by a spring-biased parallel linkage, the release means adapted to prevent operation of the linkage comprising an engagement element engaging an abutment on the linkage, a part of the engagement element being retained by a retaining plate, the retaining plate being adapted to be moved to a position in which it no longer retains the engagement element in response to the movement of said pressure responsive element within the back-rest, permitting the engagement element to move so that operation of the parallel linkage is permitted.

15. An arrangement according to claim 14 wherein the engagement element is a pivotally mounted hook.

16. A head-rest for a vehicle seat having a seat back, the head-rest being mounted in position on the vehicle seat in such a way that the headrest can move from an initial position to a final position in which the head-rest is located forwardly of the initial position, comprising a spring mechanism adapted to move the head-rest from the initial position to the final position, release means actuated by movement of a pressure responsive element within the seat back to prevent operation of the spring mechanism, and to release the spring mechanism to permit operation of the spring mechanism when pressure is applied to the pressure responsive element during a rear impact;

wherein the pressure responsive element is mounted for movement on a support arm, the support arm being adapted to rotate about a substantially horizontal pivot axis; and wherein the release means includes a lever arm, one end of the lever arm which initially engages a pivotally mounted retainer arm, to hold the retainer arm in position, the retainer arm having a guide surface engaged by a projection connected to the head-rest, the arrangement being such that a predetermined movement of the lever arm will release the retainer arm, thus permitting the retainer arm to move and allow the head-rest to move to the final position with the projection moving along the guide surface.

17. An arrangement according to claim 16 wherein the support arm carries a projecting finger comprising the projection, and the arrangement is such that the lever arm is moved in response to a predetermined movement of the finger.

18. An arrangement according to claim 16 wherein the guide surface forms one side of a close ended slot in the retainer arm, the projection being received in the slot.

* * * * *